Patented Apr. 5, 1938

2,112,903

UNITED STATES PATENT OFFICE 2,112,903

PRODUCTION OF ALKALINE EARTH CARBONATE

Harold Simmons Booth, Cleveland Heights, Ohio

No Drawing. Application July 6, 1936,
Serial No. 89,134

2 Claims. (Cl. 23—66)

This invention relates to conversion of water insoluble compounds of the alkaline earth metals to water soluble or dilute acid soluble compounds thereof by reactions in fused, anhydrous, inert solvents with reactants (water soluble alkali metal and alkaline earth metal compounds) capable of reacting to produce water soluble or dilute acid soluble compounds.

Many of the naturally occurring compounds and ores of the alkaline earth metals are limited in their commercial value because of insolubility in water and in dilute acids. Typical among such compounds are barytes ($BaSO_4$) and fluor-spar ($CaF_2$). It is the purpose of this invention to produce a process for the easy and economical conversion of such compounds into water-soluble or dilute-acid-soluble compounds.

Basically, the process involves the principle that the alkaline earth compounds of the type indicated, despite their insolubility in water and related solvents, are soluble in fused electrolytes of the alkaline and alkaline earth halide type, though not chemically affected thereby. For example, sodium chloride, an extremely cheap material, dissolves large quantities of $BaSO_4$, and such sodium chloride may be viewed as a normal solvent, leading to typical ionization and metathesis reactions. Similarly, calcium chloride dissolves large quantities of calcium fluoride, and ionizes the latter.

Utilizing such alkaline or alkaline earth halide solvents as reacting media, I have found it possible to obtain effective metathetical conversions. For example, to convert the comparatively low-valued natural barytes into barium carbonate, the former may be dissolved in fused sodium chloride. In the case of impure ore, the barium sulfate can be separated at this point from naturally occurring contaminants, such as silica and iron oxide, by decantation of the fused solution from these insoluble materials. Thereafter conversion may be effected by addition of an alkali carbonate soluble in the fused salt without decomposition—e. g., $Na_2CO_3$. Although no visible reaction or change can be noted, the reversible reaction

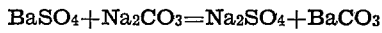
$BaSO_4 + Na_2CO_3 = Na_2SO_4 + BaCO_3$ may be considered as having occurred in the fused salt bath. If, now, the molten mass be cooled and dissolved in water, the sodium compound goes into solution, while the barium carbonate, being insoluble, is precipitated, and may be removed from the liquid portion by any desired method, for example, filtration or decantation. To produce almost complete conversion (99%), an excess of $Na_2CO_3$ is, of course, essential—in the case mentioned, about 3.4 equivalents have been found necessary. In conjunction with this, however, we may consider that direct fusion with $Na_2CO_3$ alone, in the absence of any salt fusion bath as solvent, calls for an excess of twenty equivalents of $Na_2CO_3$. These data, which are given merely as indicative of qualitative differences, were obtained by treating 10 parts of $BaSO_4$ in 25 parts of molten salt, with 20 parts of $Na_2CO_3$.

An even more effective conversion is obtained when celestite ($SrSO_4$) is treated with sodium carbonate to obtain strontium carbonate. In this case only a very slight excess of alkali carbonate is needed to obtain practically perfect conversion. For a conversion value of 99.9%, only 0.17 equivalent excess sodium carbonate need be used with NaCl as solvent; here again, the exact value obtained will vary with differing details of operation.

The conversion of gypsum to calcium carbonate can be effected in the manner just described for the corresponding barium and strontium compounds.

In addition to the sulfates, insoluble fluorine compounds of the alkaline earth families can be reacted in identically the same manner, using, e. g. potassium chloride as inert solvent, although in this case it is feasible to use an alkaline earth halide, like $CaCl_2$, as solvent, to increase the solubility of the fluoride. Also, it is preferable to use $K_2CO_3$ rather than $Na_2CO_3$, because of the much greater water-solubility of the resulting KF than of NaF, making separation from the alkaline-earth carbonate much easier.

As an example of the formation of the water-soluble chlorides, I may cite the production of barium chloride from barium sulfate. The barytes is dissolved in a molten, inert salt, like sodium chloride, decanted if desired from insoluble impurities, and to this fused solution there is then added calcium chloride as reactant. The reaction

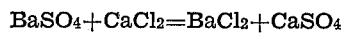
$BaSO_4 + CaCl_2 = BaCl_2 + CaSO_4$ is incomplete if merely equivalent quantities are used; by means of sufficient excess of calcium chloride, practically all of the barium can be recovered in the form of $BaCl_2$; this is accomplished by solution of the melt, cooled or quenched, in water, and separating in any suitable manner, as by crystallizing. The mixed sulfates, if the reaction is not forced to completion, are valuable as paint pigments and fillers.

The procedure for the formation of strontium chloride is identical as for barium with the substitution of $SrSO_4$ for the corresponding barium compound.

This application is a continuation in part (in the nature of a division) of my copending application Serial No. 619,526, filed June 27, 1932.

Having thus described my invention, what I claim is:

1. Process of converting alkaline earth sulphates to the corresponding carbonates comprising the steps of bringing together in solution in a fused, anhydrous, water soluble, inorganic solvent inert to both, an alkaline earth sulphate and an alkali metal carbonate, and then subjecting the resulting mass to the action of water and separating the water soluble content from the water insoluble content thereof.

2. Process comprising, bringing together in a fused, inert, anhydrous, water soluble, inorganic solvent, a water insoluble alkaline earth sulfate soluble and ionizable in said solvent and a water soluble reactant for said alkaline earth compound, the same being soluble and ionizable in said solvent and being selected from the group consisting of the alkali metal carbonates, said water soluble reactant being present in excess of the chemical equivalent of the water insoluble reactant and said solvent being present in quantity more than sufficient to hold the reactants in solution.

HAROLD SIMMONS BOOTH.